(12) United States Patent
Yu et al.

(10) Patent No.: US 8,915,655 B2
(45) Date of Patent: Dec. 23, 2014

(54) OPTICAL FIBER CONNECTOR

(71) Applicant: Baycom Opto-Electronics Technology Co., Ltd., Hsinchu (TW)

(72) Inventors: Chien-Feng Yu, Hsin-Chu (TW); Tung-Chun Huang, Hsin-Chu (TW)

(73) Assignee: Baycom Opto-Electronics Technology Co., Ltd., Hsinchu (TW)

( * ) Notice: Subject to any disclaimer, the term of this patent is extended or adjusted under 35 U.S.C. 154(b) by 275 days.

(21) Appl. No.: 13/681,025

(22) Filed: Nov. 19, 2012

(65) Prior Publication Data

US 2013/0188913 A1    Jul. 25, 2013

(30) Foreign Application Priority Data

Jan. 20, 2012  (TW) .............................. 101201633 A (51) Int. Cl.
*G02B 6/36*  (2006.01)

(52) U.S. Cl.
CPC ....................................... *G02B 6/36* (2013.01)
USPC ......................................................... 385/76

(58) Field of Classification Search
USPC .................................... 385/70–72, 75–76, 78
See application file for complete search history.

(56) References Cited

U.S. PATENT DOCUMENTS 6,913,392 B2 *   7/2005   Grzegorzewska et al. ...... 385/60

* cited by examiner

*Primary Examiner* — Ryan Lepisto
*Assistant Examiner* — Erin Chiem
(74) *Attorney, Agent, or Firm* — Moser Taboada (57) ABSTRACT

An optical fiber connector includes front and back fasteners, and an end socket. The front fastener includes a front body and a pressing part. A first lateral wall of the front body has a first engaging hole and a second opposite lateral wall thereof has a second engaging hole. The back fastener includes a back body and an assembling part. The front portion of the back body is coupled with a back portion of the front body and the back body has first and second engaging blocks. The first and second engaging blocks are coupled respectively with the first and second engaging holes. The first engaging hole is sized differently from the second engaging hole. The assembling part is disposed on a back portion of the back body. An end socket has a front portion secured to the assembling part, and a back portion that has a terminal.

10 Claims, 8 Drawing Sheets

OPTICAL FIBER CONNECTOR

RELATED APPLICATIONS

This application claims priority to Taiwan Application Serial Number 101201633, filed Jan. 20, 2012, which is herein incorporated by reference.

BACKGROUND

1. Field of Invention

The present invention relates to an optical fiber connector. More particularly, the present invention relates to an optical fiber connector that is assembled in a particular, pre-set manner.

2. Description of Related Art

Communication technology changes quickly. Through use of telephones, the Internet, and other communication infrastructure, people are less distanced from each other, and information transmission in real-time is made possible. Generally, communication occurs either through a wired or wireless configuration. However, wireless communication may be affected by the weather or geography, resulting in communication interference. As a result, wire communication is still regarded as the most efficient and stable manner in which to realize communication.

Wired transmission involves transmitting an optical signal or electric signal through a cable, and of the two, optical signal transmission is faster. A fiber optic cable is used to transmit optical signals. Because the fiber optic cable is made using non-metallic materials (e.g., plastic or glass), has a good ability to resist electromagnetic and noise interference, and has several advantages like high bandwidth, light weight, ability to transmit signals a great distance, and easy concealment, the fiber optic cable has gradually replaced traditional transmission cables made of metal material.

Recently, the development of fiber optics has been such that fiber optic cables are connected with several electric devices and the information that is transmitted by fiber optic cables can be used by the electric devices. An optical fiber connector is used for connecting two optical fibers paths, and is a mechanical device that is assembled to terminal portion of an optical fiber so as to extend the optical fiber path.

Generally speaking, an optical fiber connector has an insulating body and engaging elements. A terminal of the insulating body is connected to an optical fiber for transmitting information to an electric device connected to the optical fiber connector. The traditional optical fiber connector has a front fastener and a back fastener, and the front fastener is engaged with the back fastener. If the front fastener is engaged with the back fastener using a reverse configuration, the front fastener still can be engaged with the back fastener. However, such incorrect assembly may adversely affect production efficiency and the subsequent connection to an electric device.

Therefore, there is a need to develop an optical fiber connector that is capable of avoiding the foregoing disadvantages.

SUMMARY

In accordance with the present invention, an optical fiber connector includes a front fastener, a back fastener, and an end socket. The front fastener includes a front body and a pressing part. A first lateral wall of the front body has a first engaging hole and a second opposite lateral wall of the front body has a second engaging hole. The pressing part is disposed on a front portion of a top wall of the front body. The back fastener includes a back body and an assembling part. The front portion of the back body is coupled with a back portion of the front body and the back body has a first engaging block and a second engaging block, in which the first engaging block is coupled with the first engaging hole and the second engaging block is coupled with the second engaging hole. The first engaging hole is sized differently from the second engaging hole such that the first engaging block is not capable of being coupled with the second engaging hole and the second engaging block is not capable of being coupled secured with the first engaging hole. Furthermore, the assembling part is disposed on a back portion of the back body. An end socket has a front portion secured to the assembling part, and a back portion of the end socket has a terminal.

According to an embodiment disclosed herein, a thickness of the first engaging block is increased progressively from a front portion of the first engaging block along a radial direction of the back fastener to the assembling part.

According to an embodiment disclosed herein, a thickness of the second engaging block is increased progressively from a front portion of the second engaging block along a radial direction of the back fastener to the assembling part.

According to an embodiment disclosed herein, an outer surface of the assembling part has several notches and an inner surface of the front portion of the end socket has several convex ribs, and the notches are respectively secured with the convex ribs for coupling the back assembling part with the end socket.

According to an embodiment disclosed herein, the optical fiber connector further includes an optical fiber device. The optical fiber device includes an optical fiber core, a spring, and an optical fiber-protective sleeve. The spring is disposed around the optical fiber core and within a cavity formed from the front fastener to the back fastener. The optical fiber-protective sleeve is disposed in a channel formed from the assembling part to the end socket. Furthermore, an end part of the optical fiber core is coupled in the optical fiber-protective sleeve and inserted through the terminal.

According to an embodiment disclosed herein, the optical fiber connector further includes a dust jacket fastenable to an opening of the front fastener.

According to an embodiment disclosed herein, the back fastener includes a blocking part located between the back body and the assembling part for blocking a front terminal portion of the end socket using a back surface of the blocking part.

According to an embodiment disclosed herein, two lateral walls of the front part of the end socket have several notches.

According to an embodiment disclosed herein, the optical fiber connector further includes a combiner, and the combiner includes a combining body, a pressing element, and several convex strips. The combining body has two resilient lateral walls extending downward and forms a concave structure therebetween. The pressing element is located on a back terminal portion of a top flange of the combining body, in which a top end of the pressing element is disposed above a top flange of the pressing part. The convex strips are located on two inner lateral walls of the combining body for securing with the notches of the end socket.

According to an embodiment disclosed herein, the top flange of the front fastener is upwardly curved and the top flange of the pressing element of the combiner is in contact with the top flange of the pressing part and downwardly curved.

Thus, the optical fiber connector herein can solve the prior art problem of incorrect assembly when the front fastener is secured with the back fastener.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

The present invention provides an optical fiber connector that provides several enhanced elements for securing the optical fiber connector, ultimately preventing incorrect assembly.

Figure 1:
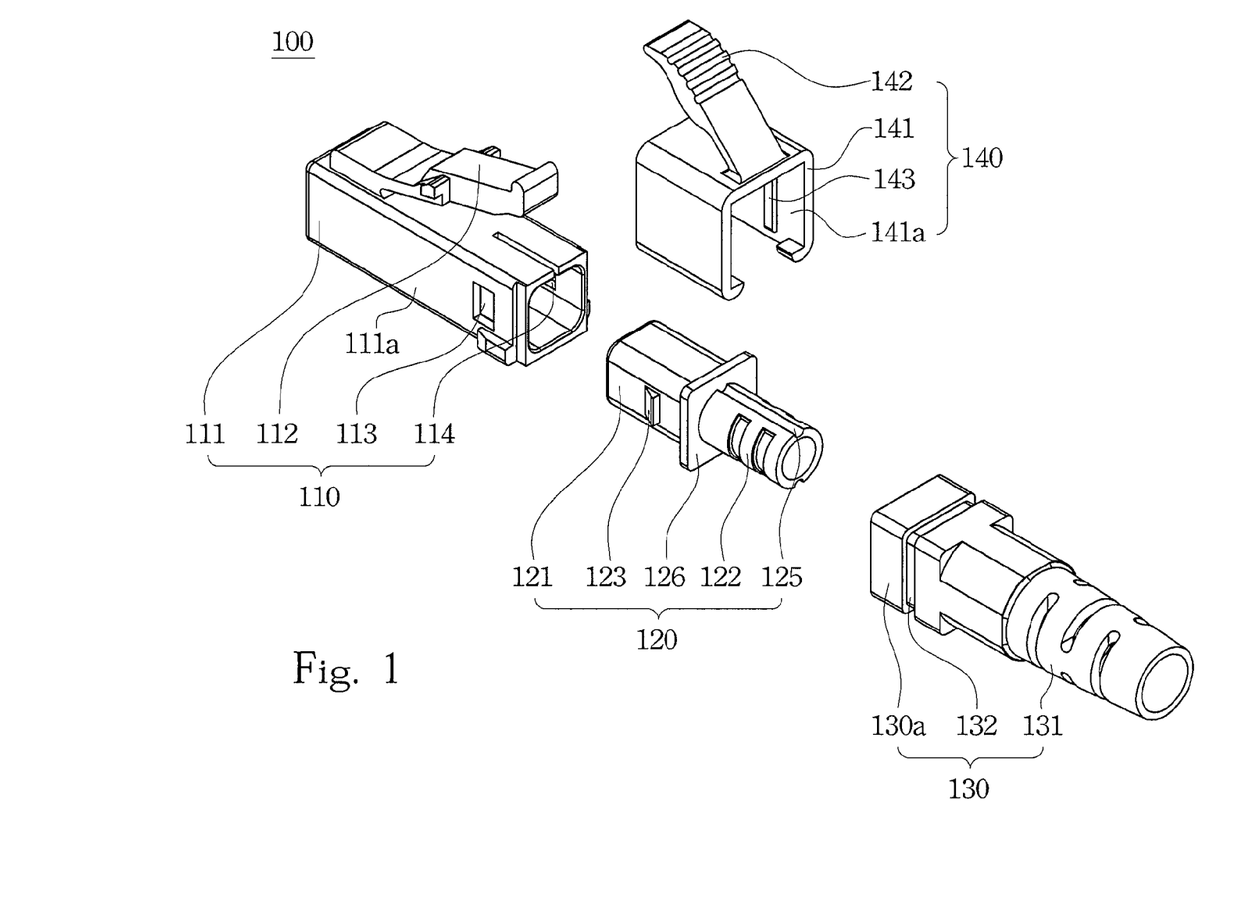
FIG. 1 illustrates an exploded perspective view of an optical fiber connector according to an embodiment of the present invention.
Figure 2:
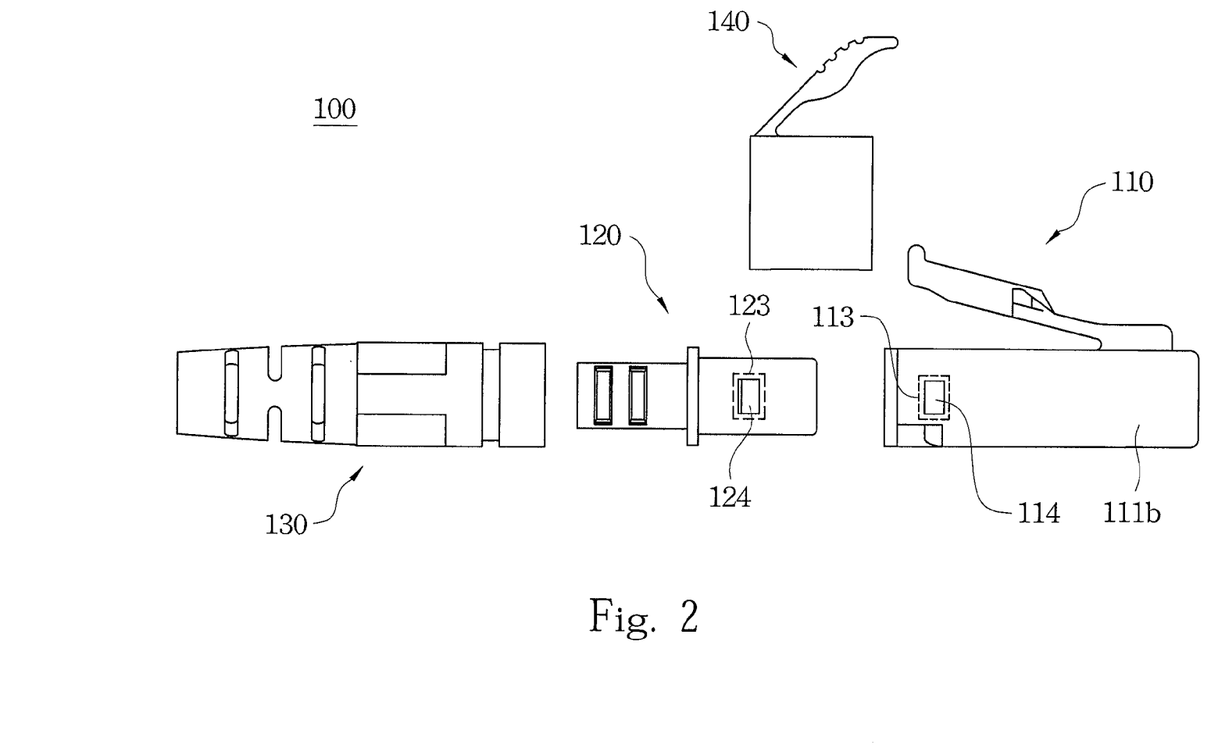
FIG. 2 illustrates an exploded lateral view of the optical fiber connector of FIG. 1.

FIG. 1 illustrates an exploded perspective view of an optical fiber connector according 100 to an embodiment of the present invention and FIG. 2 illustrates an exploded lateral view of the optical fiber connector 100 of FIG. 1. The optical fiber connector 100 includes a front fastener 110, a back fastener 120, and an end socket 130. The front fastener 110 includes a front body 111 and a pressing part 112. A first lateral wall 111a of the front body 111 has a first engaging hole 113 and a second opposite lateral wall 111b of the front body 111 has a second engaging hole 114. The pressing part 112 is located on a front portion of a top wall of the front body 111, and is used for making the front fastener 110 withdraw from an optical fiber connection port (not shown). The back fastener 120 includes a back body 121 and an assembling part 122. The front portion of the back body 121 of the back fastener 120 is coupled with a back portion of the front body 111. Moreover, the back body 121 of the back fastener 120 has a first engaging block 123 and a second engaging block 124, in which the first engaging block 123 is coupled with the first engaging hole 113 of the front fastener 110 and the second engaging block 124 is coupled with the second engaging hole 114 of the front fastener 110.

It is noted that the first engaging hole 113 is sized differently from the second engaging hole 114, and the first and second engaging blocks 123, 124 are sized corresponding respectively to the sizes of the first and second engaging holes 113, 114, such that the first engaging block 123 is not capable of being coupled with the second engaging hole 114 and the second engaging block 124 is not capable of being coupled with the first engaging hole 113. In this embodiment, the first engaging hole 113 is larger than the second engaging hole 114 and the first engaging block 123 is larger than the second engaging block 124 such that the first engaging block 123 is not capable of being coupled with the second engaging hole 114 and the second engaging block 124 is not capable of being coupled with the first engaging hole 113.

Furthermore, the assembling part 122 of the back fastener 120 is located on a back portion of the back body 121 of the back fastener 120. A front portion of the end socket 130 is secured with the assembling part 122 of the back fastener 120 and a back portion of the end socket 130 has a terminal 131. The terminal 131 may be connected with an optical fiber.

In addition, two lateral walls 130a of the front portion of the end socket 130 have several notches 132 and the end socket 130 may be secured with a combiner 140 through use of the notches 132 (as explained directly below). The combiner 140 includes a combining body 141, a pressing element 142, and several convex strips 143. The combining body 141 has two resilient lateral walls extending downward and forming a concave structure therebetween. The pressing element 142 is located on a back terminal portion of a top wall of the combining body 141, in which a top flange of the pressing element 142 is arranged above a top flange of the pressing part 112 of the front fastener 110. The convex strips 143 are located on two inner lateral walls of the combining body 141 for securing with the notches 132 of the end socket 130.

Figure 3:
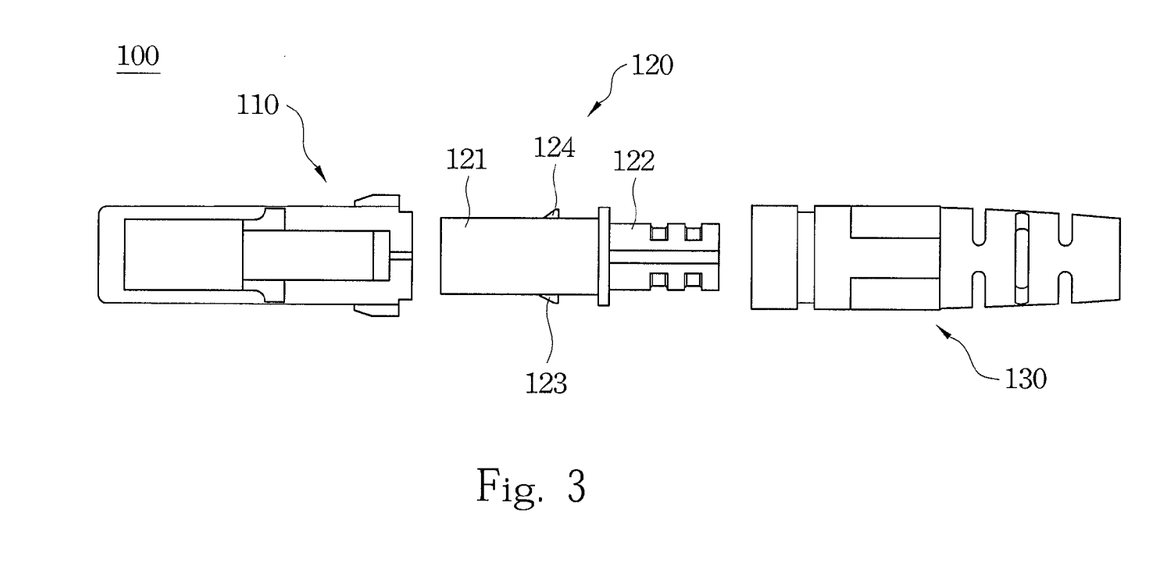
FIG. 3 illustrates an exploded top view of the optical fiber connector of FIG. 1, in which a combiner of the optical fiber connector is not shown.

FIG. 3 illustrates an exploded top view of the optical fiber connector of FIG. 1, in which the combiner of the optical fiber connector is not shown. A thickness of the first engaging block 123 is increased progressively from a front portion of the first engaging block 123 along a radial direction of the back fastener 120 to the assembling part 122 and a thickness of the second engaging block 124 is increased progressively from a front portion of the second engaging block 124 along a radial direction of the back fastener 120 to the assembling part 122, and with this configuration, the first engaging block 123 may slide into the first engaging hole 113 (see FIG. 1) and the second engaging block 124 may slide into the second engaging hole 114 (see FIG. 2). Thus, the front fastener 110 may be coupled securely with the back fastener 120.

Figure 4:
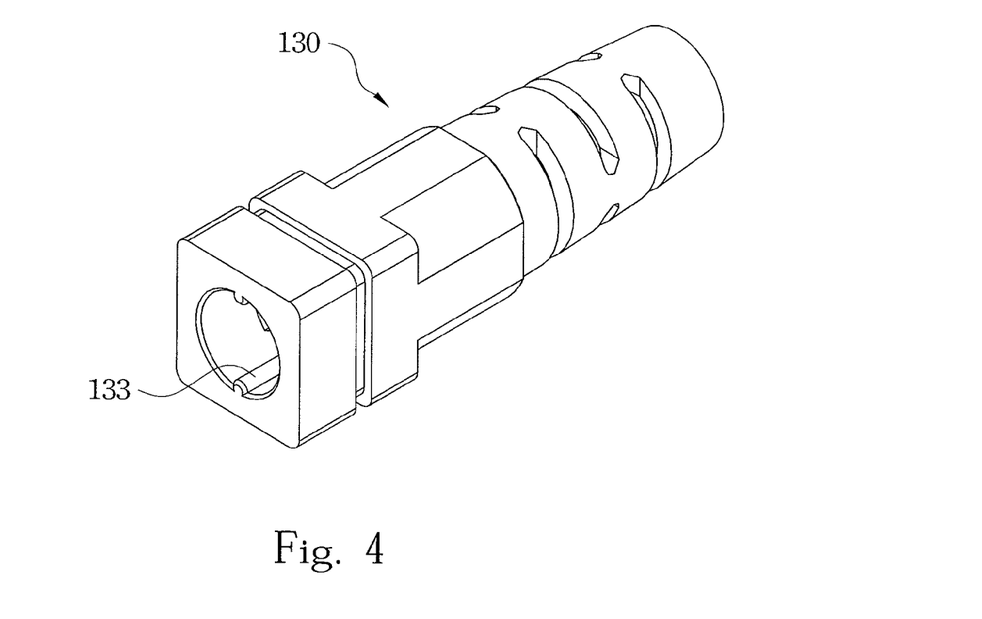
FIG. 4 illustrates a perspective view of an end socket of the optical fiber connector of FIG. 1.
Figure 5:
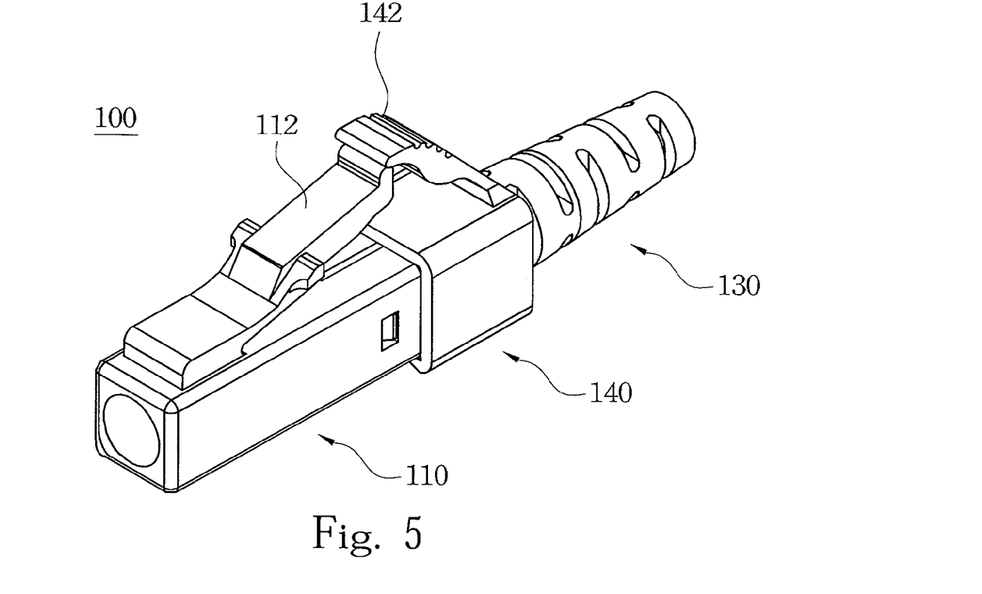
FIG. 5 illustrates a perspective view of the optical fiber connector of FIG. 1 in an assembled state.

FIG. 4 illustrates a perspective view of the end socket of the optical fiber connector of FIG. 1 and FIG. 5 illustrates a perspective view of the optical fiber connector of FIG. 1 in an assembled state. A front portion of the back body 121 is inserted into a back hole of the front body 111 of the front fastener 110. Subsequently, the first engaging block 123 is coupled with the first engaging hole 113 and the second engaging block 124 is coupled with the second engaging hole 114. As described above, the thickness of the first engaging block 123 is increased progressively from the front portion of the first engaging block 123 along the radial direction of the back fastener 120 to the assembling part 122 and the thickness of the second engaging block 124 is increased progressively from the front portion of the second engaging block 124 along the radial direction of the back fastener 120 to the assembling part 122. With this configuration, the first engaging block 123 may slide into the first engaging hole 113 (see FIG. 1) and the second engaging block 124 may slide into the second engaging hole 114 (see FIG. 2). Thus, the front fastener 110 may be coupled securely with the back fastener 120.

An outer surface of the assembling part 122 of the back fastener 120 has several notches 125 and an inner surface of the front portion of the end socket 130 (see FIG. 4) has several convex ribs 133. The notches 125 are respectively secured with the convex ribs 133 for securing the back assembling part 122 of the back fastener 120 with the end socket 130. Furthermore, the back fastener 120 includes a blocking part 126 located between the back body 121 and the assembling part 122 for blocking a front terminal portion of the end socket 130 using a back surface of the blocking part 126.

As described above, the optical fiber connector 100 further includes the combiner 140 for combining with the back fastener 120. The combiner 140 has the combining body 141, and the pressing element 142 which is formed starting from the back terminal portion of the top wall of the combining body 141. The combining body 141 has the convex strips 143 to be coupled with the notches 132 of the end sockets 130. After the end socket 130 is secured with the back fastener 120 and the front fastener 110 is coupled with the back fastener 120, the top flange of the pressing element 142 is arranged above the top flange of the pressing part 112 and an end of the pressing part 112 that is not connected to the top surface of the front fastener 110 is upwardly curved and the top flange of the pressing element 142 of the combiner 140 is in contact with the top flange of the pressing part 112 and downwardly curved. The pressing element 142 is pressed to push forward the pressing part 112 so that the front fastener 110 is removed from an optical fiber connection port (not shown).

Figure 6:
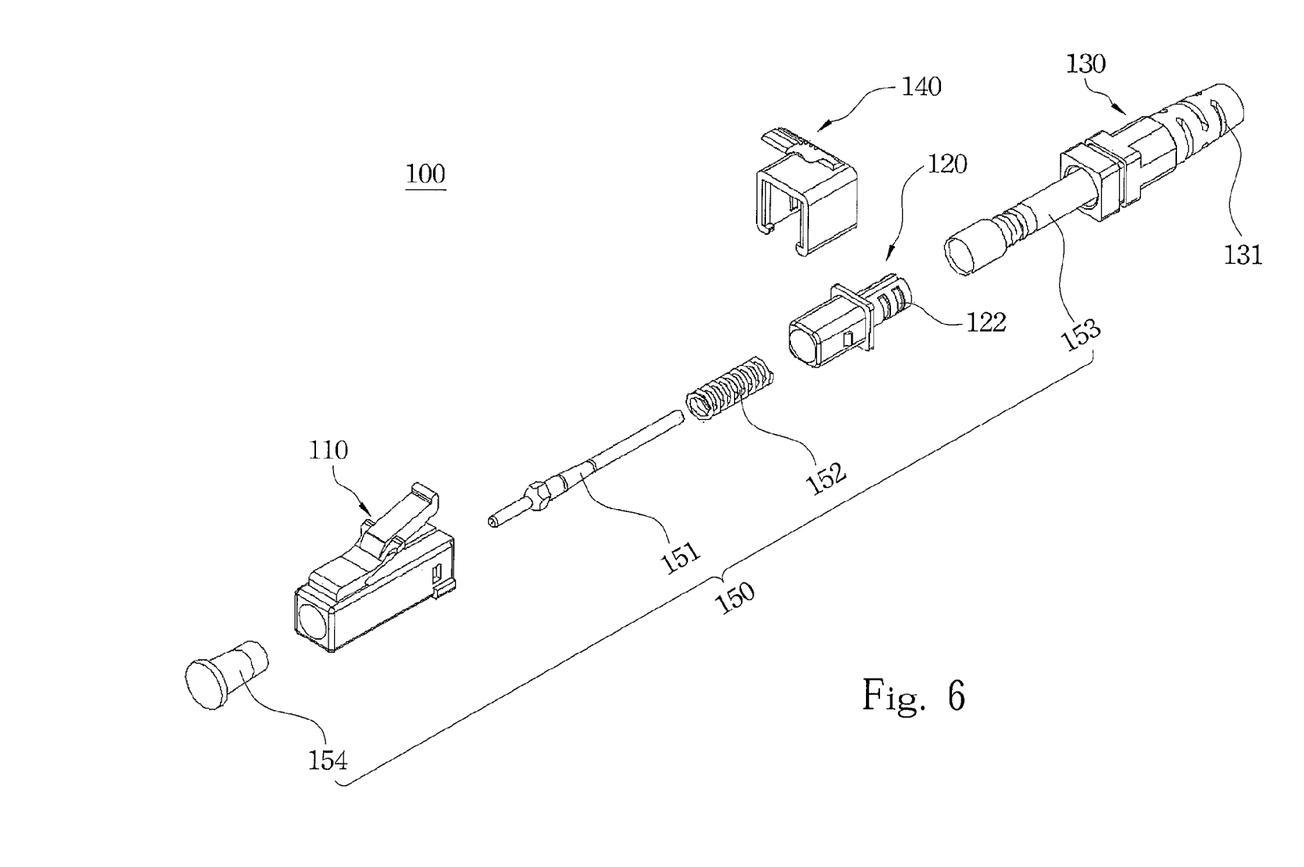
FIG. 6 illustrates an exploded perspective view of an optical fiber connector according to an embodiment of the present invention.
Figure 7:
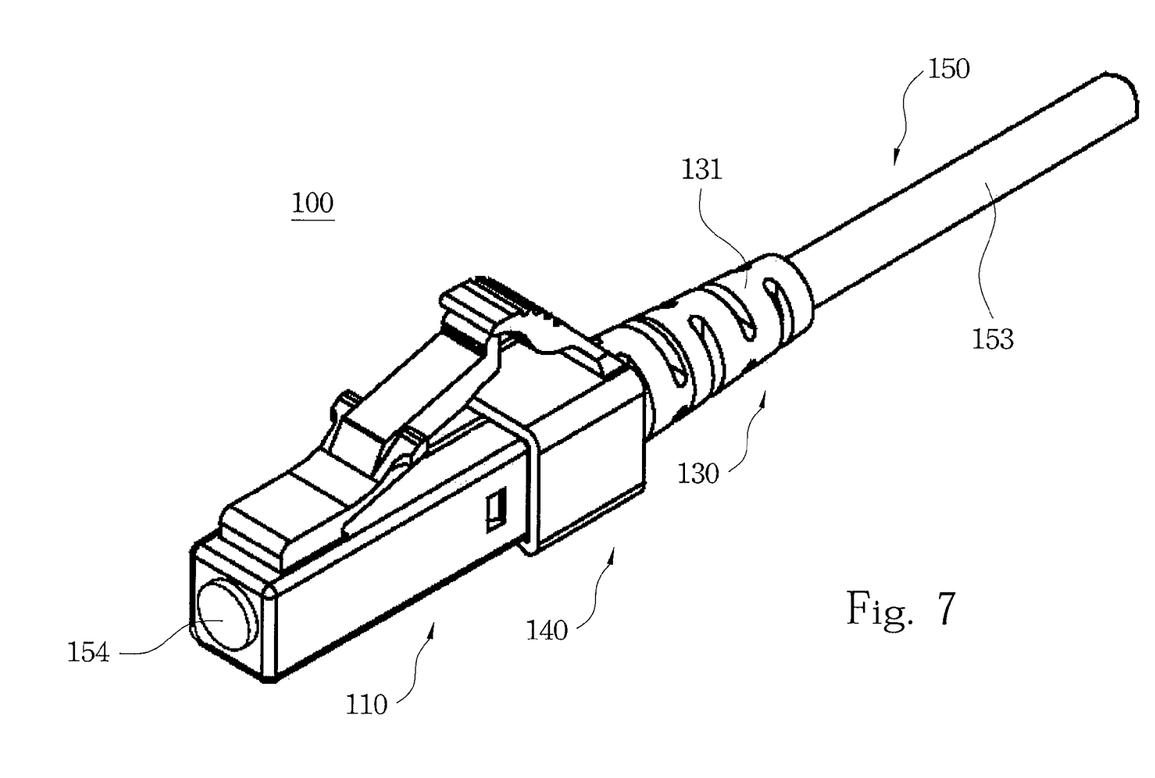
FIG. 7 illustrates a perspective view of the optical fiber connector of FIG. 6.

FIG. 6 illustrates an exploded perspective view of an optical fiber connector 100 according to an embodiment of the present invention is applied and FIG. 7 illustrates a perspective view of the optical fiber connector 100 of FIG. 6. In this embodiment, the optical fiber connector 100 further includes an optical fiber device 150. The optical fiber device 150 includes an optical fiber core 151, a spring 152, and an optical fiber-protective sleeve 153. The spring 152 is arranged around the optical fiber core 151 and within a cavity formed from the front fastener 110 to the back fastener 120. The optical fiber-protective sleeve 153 is arranged in a channel formed by the assembling part 122 and the end socket 130. Furthermore, an end part of the optical fiber core 151 is coupled in the optical fiber-protective sleeve 153 and inserted through the terminal 131. In this embodiment, the optical fiber connector 100 further includes a dust jacket 154 fastened to an opening of the front fastener 110 for preventing dust from entering into the front fastener 110 when the front fastener 110 is not inserted into an optical fiber communication port.

Figure 8:
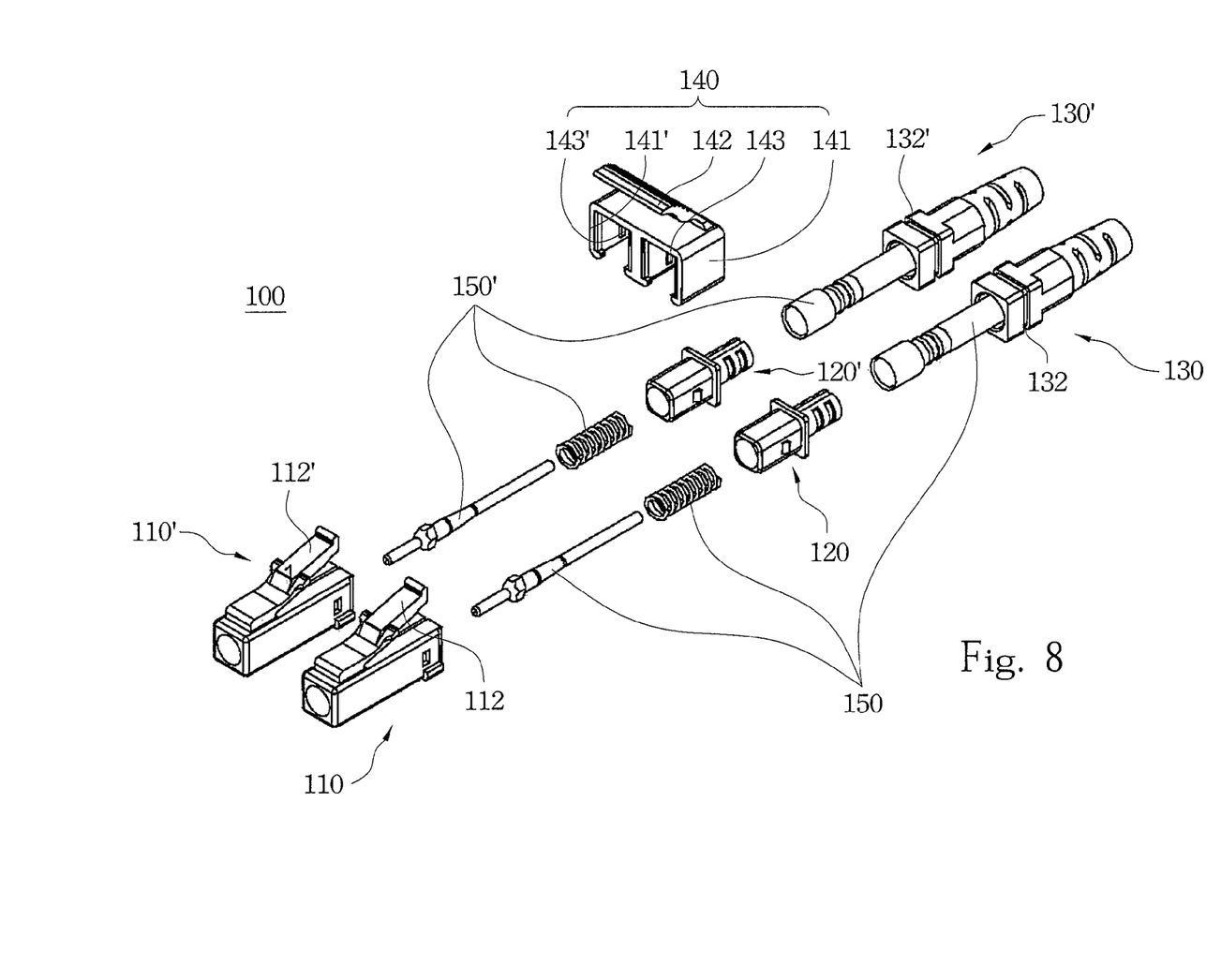
FIG. 8 illustrates an exploded perspective view of an optical fiber connector according to an embodiment of the present invention.
Figure 9:
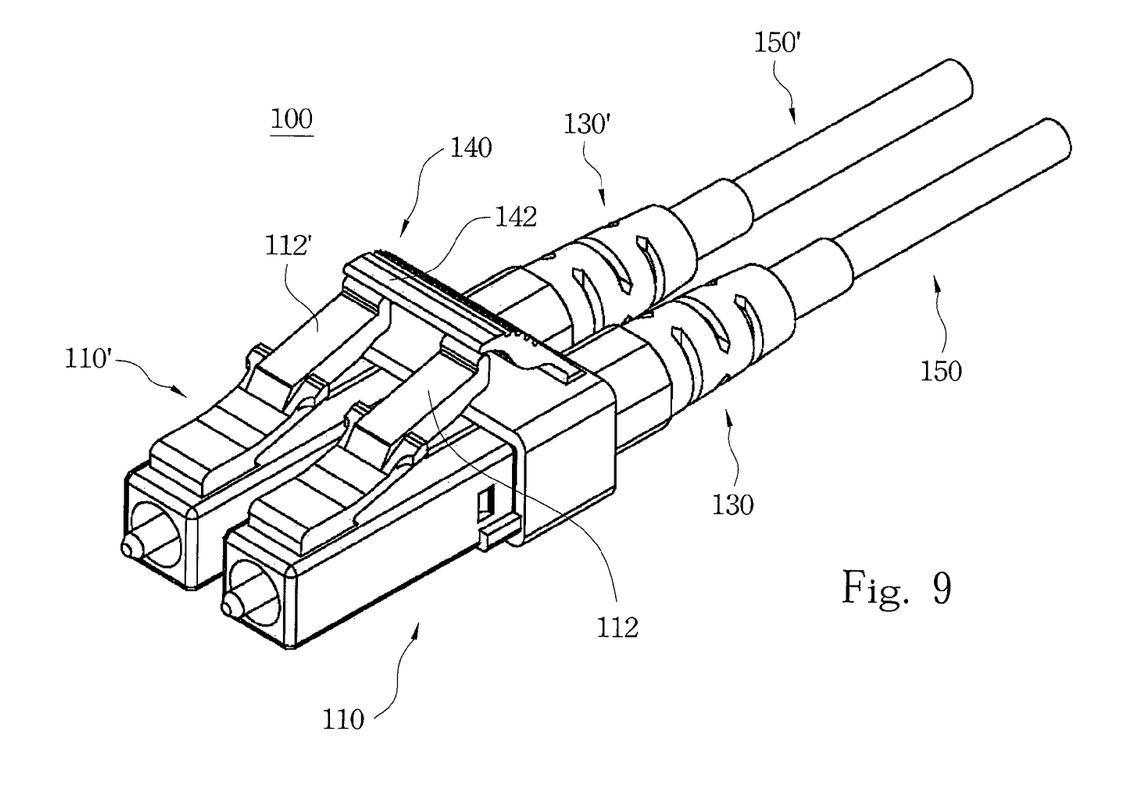
FIG. 9 illustrates a perspective view of the optical fiber connector of FIG. 8.

FIG. 8 illustrates an exploded perspective view of an optical fiber connector 100 according to an embodiment of the present invention and FIG. 9 illustrates a perspective view of the optical fiber connector 100 of FIG. 8. In this embodiment, the optical fiber connector 100 includes two front fasteners 110/110', two back fasteners 120/120', two end sockets 130/130', and two optical fiber devices 150/150'. The optical fiber connector 100 further includes a combiner 140 for combining the back fasteners 120/120'. The combiner 140 has two combining bodies 141/141' and a pressing element 142 is formed starting from a back terminal portion of a common top wall of the combining bodies 141/141'. The two combining bodies 141/141' have convex strips 143/143' to be coupled with notches 132/132' of the end sockets 130/130'. After the end sockets 130/130' are secured with the back fasteners 120/120' and the front fasteners 110/110' are coupled with the back fasteners 120/120', the optical fiber devices 150/150' are located in the back fasteners 120/120' and the front fasteners 110/110'. Furthermore, a top end of the pressing element 142 is arranged above top ends of the pressing parts 112/112' and ends of the pressing parts 112/112' that are not connected to the top surface of the front fasteners 110/110' are upwardly curved and a top flange of the pressing element 142 of the combiner 140 in contact with top flanges of the pressing parts 112/112' is downwardly curved. The pressing element 142 is pressed to push the pressing parts 112/112' so that the two front fasteners 110/110' are removed from an optical fiber connection port (not shown) at the same time.

According to the above-described embodiments, the optical fiber connector herein may be assembled only in a particular manner, that is, the front fastener is assembled to the back fastener in a particular, pre-set manner, so that the problem of incorrect assembly associated with the traditional optical fiber connector may be solved. The combiner may be combined with several front fasteners and the pressing element of the combiner can operate several pressing parts to remove the front fasteners from an optical fiber connection port(s) at the same time.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical fiber connector comprising:
   a front fastener comprising a front body and a pressing part, a first lateral wall of the front body having a first engaging hole and a second opposite lateral wall of the front body having a second engaging hole, the pressing part being disposed on a front portion of a top wall of the front body;
   a back fastener comprising a back body and an assembling part, a front portion of the back body being coupled with a back portion of the front body and the back body having a first engaging block and a second engaging block, wherein the first engaging block is coupled with the first engaging hole and the second engaging block is coupled with the second engaging hole, wherein the first engaging hole is sized differently from the second engaging hole such that the first engaging block is not capable of being coupled with the second engaging hole and the second engaging block is not capable of being coupled with the first engaging hole, the assembling part being disposed on a back portion of the back body; and
   an end socket having a front portion secured to the assembling part, and a back portion of the end socket having a terminal.

2. The optical fiber connector of claim 1, wherein a thickness of the first engaging block is increased progressively from a front portion of the first engaging block along a radial direction of the back fastener to the assembling part.

3. The optical fiber connector of claim 1, wherein a thickness of the second engaging block is increased progressively from a front portion of the second engaging block along a radial direction of the back fastener to the assembling part.

4. The optical fiber connector of claim 1, wherein an outer surface of the assembling part has a plurality of notches and an inner surface of the front portion of the end socket has a plurality of convex ribs, and the notches are respectively secured with the convex ribs for coupling the back assembling part with the end socket.

5. The optical fiber connector of claim 1, further comprising an optical fiber device, the optical fiber device comprising:
   an optical fiber core;

a spring disposed around the optical fiber core and within a cavity formed by the front fastener to the back fastener; and an optical fiber-protective sleeve disposed in a channel formed from the assembling part to the end socket, an end part of the optical fiber core being coupled in the optical fiber-protective sleeve and inserted through the terminal.

6. The optical fiber connector of claim 5, further comprising a dust jacket fastenable to an opening of the front fastener.

7. The optical fiber connector of claim 1, wherein the back fastener comprises a blocking part located between the back body and the assembling part for blocking a front terminal portion of the end socket using a back surface of the blocking part.

8. The optical fiber connector of claim 1, wherein two lateral walls of the front part of the end socket have a plurality of notches.

9. The optical fiber connector of claim 8, further comprising a combiner, the combiner comprising:

a combining body having two resilient lateral walls extending downward and forming a concave structure therebetween;

a pressing element located on a back terminal portion of a top wall of the combining body, wherein a top flange of the pressing element is disposed above a top flange of the pressing part; and a plurality of convex strips located on two inner lateral walls of the combining body for securing with the notches of the end socket.

10. The optical fiber connector of claim 9, wherein the top flange of the front fastener is upwardly curved and the top flange of the pressing element of the combiner is in contact with the top flange of the pressing part and downwardly curved.

* * * * *